July 28, 1931.  C. USCHMANN  1,816,505
ENGRAVING MACHINE
Filed Dec. 23, 1926
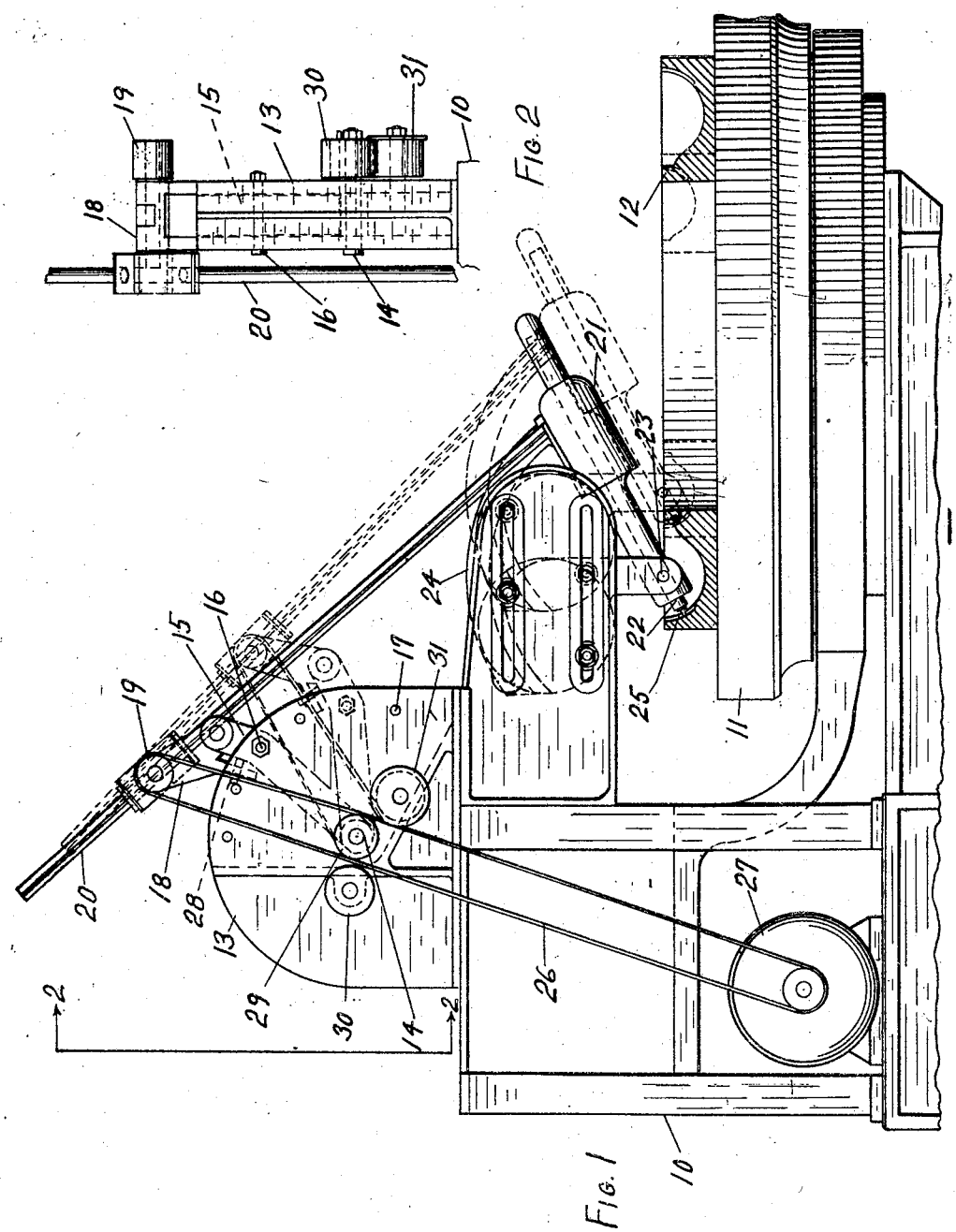
INVENTOR.
CURT USCHMANN
BY
*Ely + Barrow*
ATTORNEYS Patented July 28, 1931

1,816,505

UNITED STATES PATENT OFFICE

CURT USCHMANN, OF AKRON, OHIO, ASSIGNOR TO THE FIRESTONE TIRE AND RUBBER COMPANY, OF AKRON, OHIO, A CORPORATION OF OHIO

ENGRAVING MACHINE

Application filed December 23, 1926. Serial No. 156,626.

This invention relates to engraving machines used in the manufacture of automobile tire molds such as that disclosed by A. A. Bush in Patent No. 1,561,214, and particularly pertains to the mounting for the tool actuating shaft of such machine.

An object of this invention is to provide an adjustable mounting for the tool actuating shaft of engraving machines, which will permit the manufacture of various sized molds without the necessity of changing the shaft for one of shorter or longer dimensions. A further object is to provide means whereby a belt driving the shaft may follow the adjustable mounting without necessitating changing the length of the belt.

The foregoing and other objects are obtained by the device illustrated in the accompanying drawings and described below. It is to be understood that the device is not limited to the specific form thereof disclosed herein.

Of the accompanying drawings:

Figure 1 is a side elevation of an engraving machine embodying the principles of the invention; and Figure 2 is an end elevation of the shaft mounting as viewed from the line 2—2 of Figure 1.

Referring more particularly to the drawings, 10 represents the frame of an engraving machine having rotatably mounted thereon a table 11 to which is clamped a tire mold 12 to be engraved. A bracket 13 is attached to the top of frame 10 and has projecting therethrough a shaft 14. An arm 15 is pivoted to shaft 14 and is adapted to be positioned vertically, horizontally, and at intermediate points, being held in place at any desired position by a bolt 16 passing through apertures 17 in the bracket, another position of the parts being shown in dotted lines in Figure 1. Pivotally mounted on arm 15 is a head 18 carrying a drive pulley 19 connected by suitable bevel gears (not shown) to a slidable shaft 20, which is in turn operatively connected through lever arm 21 to rotate cutting tool 22. Lever arm 21 is pivoted to a support 23 and may be rocked by a rod 24 connected to an actuating mechanism (not shown) to swing the cutting tool through the arc of a circle to cut a groove 25 in the tire mold. Support 23 is adjustably secured to frame 10 whereby it may be adjusted radially with respect to the mold table when tire molds of various diameters are to be engraved. Pulley 19 is rotated by a belt 26 operated by a motor 27, tension in the belt being adjustable by a screw 28 threaded through pivoted head 18 and abutting arm 15. In order that the belt may be swung to another position when the positioning of arm 15 is changed, an inner idler pulley 29 is journaled to the projecting end of shaft 14, while idlers 30 and 31 engage the outside of the belt on either side of idler 29. Thus pulley 19 may be swung through an arc for any adjustment without changing the length of the belt since the upper portion thereof swings about the same center as arm 15.

The full lines in Figure 1 show the parts in position for engraving a large mold, arm 15 being raised to one of the upper positions. For engraving a smaller mold, arm 15 is secured in one of the lower apertures, the parts taking the position shown in dotted lines. Since head 18 follows lever arm 21 when the new adjustment is being made, the same drive shaft 20 is used, thus obviating the use of a different length of drive shaft every time a different size of mold is to be engraved.

Modifications of the invention may be resorted to without departing from the spirit thereof or the scope of the appended claims.

What is claimed is:

1. In an engraving machine, an engraving tool driving mechanism comprising a pivoted lever for carrying the engraving tool, a drive shaft operatively connected at one end thereof to the lever for rotating the tool, a head slidably connected to the shaft adjacent the other end thereof, a driven pulley attached to the head for rotating the shaft, a pivoted arm for carrying the head, a bracket on which said arm is mounted, said bracket having a plurality of apertures therein, whereby the arm and head may be swung through an arc and fixed in adjustable angular relation to the bracket by a pin passing through the arm and one of said apertures, an idler pulley rotatably mounted on the same axis as the pivoted arm, a driving belt trained over said driven pulley and passing on both sides of said idler pulley, an additional idler pulley mounted beside the first-mentioned idler pulley for engaging the outside of said belt, and means for driving said belt.

2. In an engraving machine, an engraving tool driving mechanism comprising a rotatable shaft for rotating said tool, a driving head in which said shaft is slidably mounted, a pulley mounted on said head for rotating the shaft, a pivoted arm for carrying the head, a bracket on which said arm is mounted, said bracket having a plurality of apertures therein, whereby the arm and head may be swung through an arc and fixed in adjustable angular relation to the bracket by a pin passing through the arm and one of said apertures, a driving belt trained over said pulley, an idler pulley mounted on the same axis as said arm and adapted to engage the inner sides of said belt, and a further idler pulley mounted on either side of the first-mentioned idler pulley and adapted to engage the outer sides of said belt.

3. In an engraving machine, a drive shaft mounting, comprising a drive shaft, a head in which said shaft is mounted, a pulley mounted on said head for rotating the shaft, a pivoted arm for carrying the head, a bracket to which the arm is pivoted, said arm being angularly adjustable for positioning the head at various points on the bracket, a belt trained over said pulley for rotating the same, an idler pulley rotatably mounted on the same axis as the pivoted arm and adapted to engage the inner sides of said belt, and additional idler pulleys mounted on each side of the first-mentioned idler pulley for engaging the outside of said belt when the arm is adjusted at various angular positions.

4. In an engraving machine, a drive shaft mounting, comprising an angularly adjustable, pivotally mounted shaft driving head, a pulley mounted on said head, a belt trained over said pulley, an idler pulley rotatably mounted on the same axis as the pivoted arm and adapted to engage the inner sides of said belt, and additional idler pulleys mounted on each side of the first-mentioned idler pulley for engaging the outside of said belt when the arm is adjusted at various angular positions.

CURT USCHMANN.